United States Patent
McCusker

(10) Patent No.: US 8,332,083 B1
(45) Date of Patent: Dec. 11, 2012

(54) SYSTEM AND METHOD FOR GENERATING A MISSED APPROACH PATH

(75) Inventor: Patrick D. McCusker, Walker, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 961 days.

(21) Appl. No.: 12/217,412

(22) Filed: Jul. 3, 2008

(51) Int. Cl.
*G01C 21/00* (2006.01)
*G01C 21/20* (2006.01)
*G08B 21/00* (2006.01)
*G05D 1/00* (2006.01)
*G05D 1/10* (2006.01)
*G06F 17/00* (2006.01)

(52) U.S. Cl. ............ 701/4; 701/122; 701/409; 701/411; 701/415; 340/945; 340/970; 73/178 T

(58) Field of Classification Search ............ 701/1, 3–10, 701/14–16, 18, 200, 207–213, 300–301, 701/120, 122, 400, 408, 409, 410, 411, 414–417, 701/423, 429, 435, 436; 340/945, 951, 963, 340/964, 970–972; 342/29; 244/75.1, 76 R; 73/178 R, 179, 178 T
See application file for complete search history.

(56) References Cited

U.S. PATENT DOCUMENTS

| | | | |
|---|---|---|---|
| 6,377,892 B1 | 4/2002 | Johnson | 701/213 |
| 6,571,155 B2 | 5/2003 | Carriker | 701/3 |
| 6,785,594 B1 | 8/2004 | Bateman | 701/9 |
| 6,816,780 B2 | 11/2004 | Naimer | 701/206 |
| 6,970,784 B2 | 11/2005 | Shinagawa | 701/204 |
| 6,980,892 B1 | 12/2005 | Chen | 701/9 |
| 7,302,318 B2 | 11/2007 | Gerrity | 701/16 |
| 2004/0093131 A1* | 5/2004 | Block et al. | 701/9 |
| 2006/0253232 A1* | 11/2006 | Gerrity et al. | 701/16 |

* cited by examiner

*Primary Examiner* — Thomas Tarcza
*Assistant Examiner* — Edward Pipala
(74) *Attorney, Agent, or Firm* — Donna P. Suchy; Daniel M. Barbieri

(57) ABSTRACT

A method for calculating a safe extraction path from a terrain-challenged airport that does not depend upon published procedures. The method includes the steps of: a) defining at least one containment zone for a circling climb departure path relative to a reference location; b) receiving aircraft performance data from an on-board flight management system; c) receiving air mass parameters from on-board aircraft sensors; d) calculating the maximum allowable climb altitude (MACA) utilizing the at least one containment zone, the received aircraft performance data, and the received air mass parameters; and, e) comparing the MACA to at least one selected safe departure altitude (SDA) to calculate the lowest possible descent altitude that can be achieved while ensuring that at least one safe extraction path exists.

15 Claims, 12 Drawing Sheets

SYSTEM AND METHOD FOR GENERATING A MISSED APPROACH PATH

BACKGROUND OF THE INVENTION

1. Field of the Invention

The present invention relates generally to aircraft flight path design, and more particularly to missed approach procedure design.

2. Description of the Related Art

There are two basic sets of rules for flight operations, Visual Flight Rules (VFR) and Instrument Flight Rules (IFR). Visual Meteorological Conditions (VMC) are those weather conditions in which pilots have sufficient visibility to maintain visual separation from terrain, obstacles, and other aircraft. Instrument Meteorological Conditions (IMC) are those weather conditions in which pilots cannot maintain visual separation from terrain, obstacles, and other aircraft.

Under Visual Flight Rules (VFR), the pilot maintains separation from terrain, obstacles, and other aircraft by visual reference to the environment surrounding the aircraft. The guiding principle for VFR is "See and Avoid". Under Instrument Flight Rules (IFR), the pilot maintains separation from terrain and obstacles by reference to aircraft instruments only. The guiding principle for IFR is "Positive Course Guidance" to track a "hazard-free path" which provides separation from terrain and obstacles. Separation from other aircraft is provided by Air Traffic Control. VFR principles may only be used under VMC; however, IFR principles are used under both VMC and IMC.

The simplest form of IFR operations is dead-reckoning where the pilot navigates using only magnetic heading, airspeed, and time. This allows the pilot to estimate his/her location by using a map to identify a starting point then using heading, speed, and time to determine distance and direction traveled from the starting point. Dead-reckoning is highly inaccurate in windy conditions because the pilot cannot accurately determine the actual ground speed or aircraft track (which differ from airspeed and heading due to the velocity of the wind). Modern inertial navigation systems automate the dead-reckoning process and provide much higher accuracies than the pilot can achieve without assistance. However, even the best, and most expensive, inertial navigation systems suffer from position errors that increase over time (typically with a drift rate of 2 nautical miles or more per hour).

Various navigational aides (NAVAIDS) have evolved over time to improve the accuracy of navigation in IMC. The first generation of NAVAIDS includes ground-based navigation radio systems such as VHF Omnidirectional Range (VOR), Distance Measuring Equipment (DME), and Instrument Landing System (ILS). These solutions allow an airborne radio receiver to determine either bearing to a ground-based transmitter (e.g. VOR) or distance to the transmitter (e.g. DME). The ILS is a specialized system that allows the airborne radio receiver to determine angular deviation from a specific bearing from the transmitter (Localizer) and specific descent path (Glide Slope). While these systems provide significant improvement in accuracy over inertial navigation systems, they require very expensive ground infrastructures which limit the number of locations where they may be installed.

Another disadvantage of ground-based radio positioning systems is that such systems provide less certainty of an aircraft's position the farther the aircraft is from the transmitter. Recognizing this limitation, regulators have established a set of criteria for building instrument-based navigational procedures called TERPS (Terminal Instrument Procedures) for designing approaches that recognize the limitations of the technology. TERPS employs trapezoidal obstacle identification surfaces that take into account inaccuracies in the aircraft's positional certainty. TERPS is formally defined in US FAA Order 8260.3B, along with associated documents in the 8260 series. The international equivalent of TERPS is called PANS-OPS, promulgated by the International Civil Aviation Organization ("ICAO") (document 8168); the two combined represent virtually 100% of conventional approaches in place today. Procedures developed in accordance with the TERPS or PANS-OPS have serious limitations in that they are written using "lowest common denominator" aircraft performance expectations. The smallest general aviation aircraft and the largest transport jets all use the same procedures to depart and arrive at terrain-challenged airport in IMC regardless of the capabilities of the aircraft or aircrew.

The next generation of NAVAIDS exploits the Global Positioning System (GPS) infrastructure which was deployed by the Department of Defense. Airborne Satellite Navigation (SATNAV) receivers can calculate the current position of the aircraft to far greater accuracy than can be achieved with VOR and DME and can provide similar performance to ILS near the runway threshold.

An emerging model for IFR operations defines operating procedures based upon the concept of Required Navigation Performance (RNP). Instead of defining approach and departure paths based upon the lowest accuracy of the available NAVAIDS, RNP defines the minimum performance requirements that an airborne system must achieve to use a published RNP procedure. In addition, a new paradigm is emerging that allows RNP procedures to be developed and published that assume Special Aircraft and Aircrew Requirements (SAAAR). Even though RNP-SAAAR procedures are published (and therefore public), they may only be used by aircraft operators that have been authorized in advance by the regulatory authorities. These RNP-SAAAR procedures will allow complex approach and missed approach procedures at terrain-challenged airport in IMC; however, there are hundreds of terrain-challenged airports around the world, and it will be a long time before procedures are developed and published for all the airports. In fact, it may be too expensive to develop RNP-SAAAR procedures for small airports that have very low utilization.

Thus, as discussed above, the TERPS defines the criteria for the creation of arrival procedure from top of descent through a successful landing or a missed approach.

The missed-approach point is the location along the approach path that the pilot must decide to continue the landing or to go around. Precision approaches have a Decision Height (DH) where the pilot must decide to land or go around. Non-precision approaches have a Minimum Descent Altitude (MDA) (i.e. lowest published descent altitude), where the pilot must have visual reference to the airport to proceed. Decision heights range from 0 feet above the runway (Cat IIIc) to 200 feet (Cat I) while minimum descent altitude range from hundreds of feet to thousands of feet above the runway.

FIG. 1 (Prior Art) shows the situation where terrain along the non-precision approach path requires the MDA to be substantially higher than the typical Decision Height on a precision approach. Since the airborne navigation systems may not have enough certainty in the determination of aircraft position to ensure clearance of the terrain, the pilot must be able to see any terrain that protrudes near to the desired descent path to the runway.

In this case, if a means can be provided to allow the pilot to have an alternative means to achieve situation awareness of the terrain along the approach path, it may be possible for the pilot to descend below the MDA to an altitude more typical of a Cat I DH.

FIG. 2 (Prior Art) shows the situation where terrain along the missed approach path requires the MDA on the non-precision approach path to be substantially higher than the typical Decision Height on a precision approach. In this case, the pilot must be able to safely perform a go-around if there is not sufficient visibility to see the runway environment. As will be disclosed below, this invention is primarily intended to provide a safe extraction path for situations where the MDA is determined by terrain and obstacles along the missed approach path. However, the inventive concepts herein may be paired with other solutions that address MDA determined by terrain and obstacles along the non-precision approach path.

The TERPS use a one-size-fits-all approach to defining MDAs and approach paths. The TERPS uses a modest climb requirement of 200 feet per nautical mile to ensure that the aircraft can climb above terrain along the missed approach path. Many modern small jets can easily outperform this climb requirement even with an engine out condition. However, published approach/miss-approach procedures are limited to the lowest performing aircraft type.

In this case, if a means can be provided to allow the pilot to verify the climb performance of the aircraft on a given day under given atmospheric conditions, then it may be possible to descend below the MDA and successfully complete a missed approach.

FIG. 3 (Prior Art) shows a worst case situation of a one-way airport where arrivals and departures may only use a single course (heading) into or out of a terrain challenged airport. This means that missed approach procedures are limited to paths that allow the aircraft to safely reverse course and leave in the opposite direction to the approach.

In this case, the aircraft cannot descend below MDA unless some means is provided to ensure that the pilot has situation awareness of all terrain and obstacles in the terminal area as well as a means to verify that the aircraft has sufficient climb performance to climb to a safe operating altitude.

Constraints:

It is highly desirable to find a means to allow an aircraft to descend below published MDAs to increase the probability that the flight can proceed to a successful landing instead of the flight diverting to an alternative airport.

It is also desirable to avoid multiple solutions to handle the various situations (listed above) that depend upon the location of hazards (terrain and human-made obstacle) in the terminal area. One common solution for all terrain-challenged airports minimizes implementation and certification costs as well as training costs once the solution is fielded.

As will be disclosed in detail below, the present patent application covers one such solution for generating a hazard-free missed approach path.

U.S. Pat. No. 7,302,318, entitled "Method for Implementing Required Navigational Performance Procedures" issued to D. J. Gerrity et al, discloses a method for designing an approach for a selected runway. The method includes gathering data regarding the height and location of all obstacles, natural and man-made, within an obstacle evaluation area. A preliminary approach path is laid out for the runway, including a missed approach segment, and a corresponding obstacle clearance surface is calculated. In the preferred method the obstacle clearance surface includes a portion underlying the desired fixed approach segment, and may be calculated using a vertical error budget approach. The obstacle clearance surface includes a missed approach segment that the aircraft will follow in the event the runway is not visually acquired by the time the aircraft reaches a decision altitude. A momentary descent segment extends between the first segment and the missed approach, and is calculated on physical principles to approximate the projected path of the aircraft during the transition from its location at the decision altitude to the missed approach segment. The preliminary path is then tested to insure that no obstacles penetrate the missed approach surface, and may be improved, e.g. lowering the decision altitude, by adjusting the obstacle clearance surface until it just touches an obstacle.

SUMMARY OF THE INVENTION

In a broad aspect, the present invention is a method for calculating a safe extraction path from a terrain-challenged airport that does not depend upon published procedures. The method includes the steps of: a) defining at least one containment zone for a circling climb departure path relative to a reference location; b) receiving aircraft performance data from an on-board flight management system; c) receiving air mass parameters from on-board aircraft sensors; d) calculating the maximum allowable climb altitude (MACA) utilizing the at least one containment zone, the received aircraft performance data, and the received air mass parameters; and, e) comparing the MACA to at least one selected safe departure altitude (SDA) to calculate the lowest descent altitude that can be achieved while ensuring that at least one safe extraction path exists.

The invention allows a pilot to climb to a safe altitude at a terrain-challenged airport using the simplest possible (Instrument Flight Rules) IFR solution which is dead-reckoning using minimal navigation information including aircraft heading, attitude, airspeed and vertical speed. The solution does not depend on published procedures such as RNP-SAAAR which may never exist for some airports.

The containment zone is preferably defined by the following steps: a) defining the maximum potential area for a potential containment zone; b) adding a TERPS (Terminal Instrument Procedures) vertical clearance requirement to a surveyed altitude of the terrain and obstacles within the potential containment zone, thus defining vertical clearance offsets being the lowest possible altitudes that the aircraft can be for any given location surrounding the reference location (airport) without violating clearance requirements; c) adding a TERPS lateral clearance requirement to all slopes facing the reference location (airport) thus defining lateral clearance offsets; and, d) defining vertical boundaries by adding an additional buffer to the vertical and lateral clearance offsets. As used hereinafter the term "TERPS" is meant to broadly refer to both the U.S. terminal instrument procedures and the international equivalent.

DETAILED DESCRIPTION OF THE INVENTION

Figure 1:
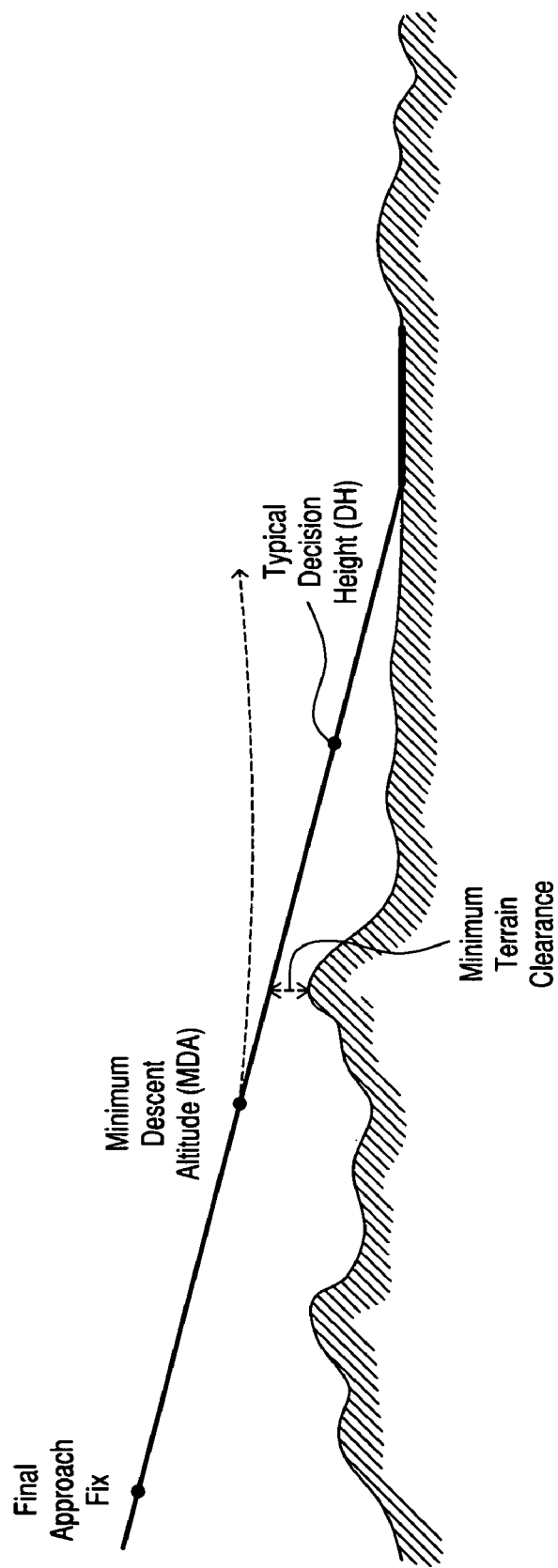
FIG. 1 (Prior Art) is a schematic illustration of a situation where terrain along the non-precision approach path requires the Minimum Descent Altitude (MDA) to be substantially higher than the typical Decision Height (DH) on a precision approach.
Figure 2:
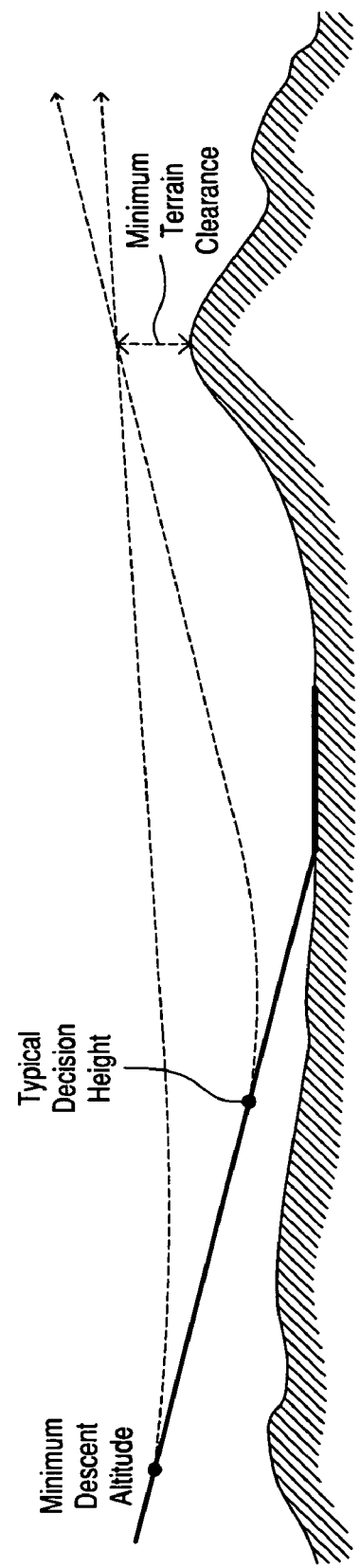
FIG. 2 (Prior Art) is a schematic illustration of a situation where terrain along the missed approach path requires the MDA on the non-precision approach path to be substantially higher than the typical Decision Height on a precision approach.
Figure 3:
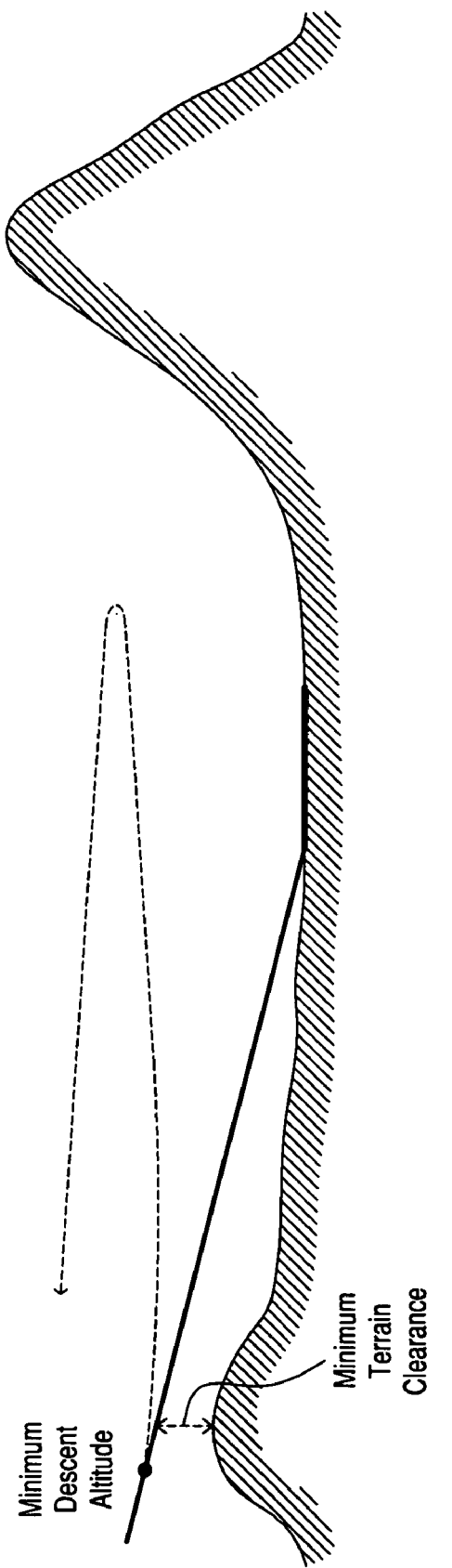
FIG. 3 (Prior Art) is a schematic illustration of a one-way airport where arrivals and departures may only use a single course (heading) into or out of a terrain challenged airport.

In the most challenging case above (the one-way airport), we first look at operations under day-light Visual Meteorological Conditions (VMC). Under VMC, the pilot uses the "see and avoid" concept to navigate to a final approach to the runway. On final approach, the pilot visually confirms the runway environment then performs the landing. During the approach procedure, the pilot will perform a go around if other traffic blunders onto the runway prior to touchdown. The pilot then uses the "see and avoid" concept to navigate to a safe altitude and then restart the approach.

The pilot can safely perform the go-around because the regulatory requirements for building airports ensure that there must be a given amount of clear airspace in the area surrounding the airport. Since the pilot can see hazards visually, it is possible to navigate safely within this clear airspace. In the worst case, pilot performs a circling climb around the airport and stays "centered" on the airport by visually confirming the aircraft position relative to the airport. A circling climb can be used at all airports even when not necessarily required to reach a safe operating altitude. So a circling climb operation becomes a candidate for creating a common solution (i.e. defining the lowest possible descent altitude) to lowering MDAs (i.e. lowest published descent altitudes) at all terrain challenged airports.

However, there is a complication. The pilot can successfully perform a circling climb at an airport under VMC because the pilot can maintain visual contact with the airport. Under IMC the pilot may not be able to see the airport. So an alternate means is needed to keep the aircraft "centered" on the airport during the circling climb. This is complicated by the fact that a circling climb is referenced to the air mass, not the earth. So when winds are present, the "center" of the climb will drift away from the center of the airport.

The goal is to create a hazard-free extraction path that allows the pilot to perform a circling climb about the airport so that the aircraft can climb to a safe operating altitude.

One potential method to create a hazard-free extraction path is to use the TERPS to define a climb procedure that works for all aircraft under all conditions, in other words, go back to a one-size-fits-all solution. The probability of success with this approach is very low, because it was the limitations of the TERPS that led to the published MDA to begin with.

Another potential method to create a hazard-free extraction path is to use aircraft performance data (as is typically embedded in an FMS) to calculate a hazard-free path in real time with constant adjustments to keep the aircraft positioned over the airport. If only this aspect were utilized it would require constant manipulation of the aircraft controls by the pilot to maintain the path generated by the system. It is likely that this type of procedure can only be performed by the flight automation systems (e.g. the FMS and the Autopilot). It is more desirable to calculate a climbing path that uses a constant bank angle to simplify the procedure for the pilot. However, a circling operation with a constant bank angle will drift away from the center of the airport as the aircraft increases in altitude.

The present invention uses elements of the above concepts without fully implementing either concept. The present invention uses the obstacle clearance requirements of the TERPS to create a database that identifies areas for which it is safe to operate the aircraft. These safe areas of operation are used as containment zones for a circling climb which starts at the center of the airport. The present invention then uses aircraft performance data as well as current air mass parameters to determine if the aircraft can climb to a safe altitude without drifting outside the containment zone.

The path for the circling climb is determined from three key data parameters: the airspeed of the aircraft, the vertical speed of the aircraft (i.e., the rate of climb of the aircraft), and the wind speed. The airspeed determines the radius of the circling climb. The vertical speed determines how much time is required to climb to any given target altitude. The wind speed determines how far the aircraft will drift during any given period of time. These three parameters are used to calculate the maximum allowable climb altitude (MACA). The radius of circling path is added to the reference point to determine the outermost extent of the circling climb under zero-wind conditions. The distance between the outermost extent of the circling climb and the innermost extent of the containment zone in the direction the wind is blowing represents the maximum allowable drift distance. The maximum allowable drift time is calculated by dividing the maximum allowable drift distance by the wind speed. The MACA is then calculated by multiplying the maximum allowable drift time by the vertical speed of the aircraft. The MACA therefore represents the maximum distance that the aircraft can climb before it drifts outside the containment zone.

The path for the circling climb is computed on just-in-time basis, prior to some decision point that is necessary to continue the approach (such as the final approach fix). If a path cannot be generated that will keep the aircraft within the containment zone, then the approach will be limited to the published approach and missed-approach procedures.

This solution allows a given aircraft type to descend below published MDA under many, but not necessarily all, atmospheric conditions. This innovation does not guarantee that an aircraft can always land at any airport, but it should dramatically reduce the number of diversions that occur.

Figure 4:
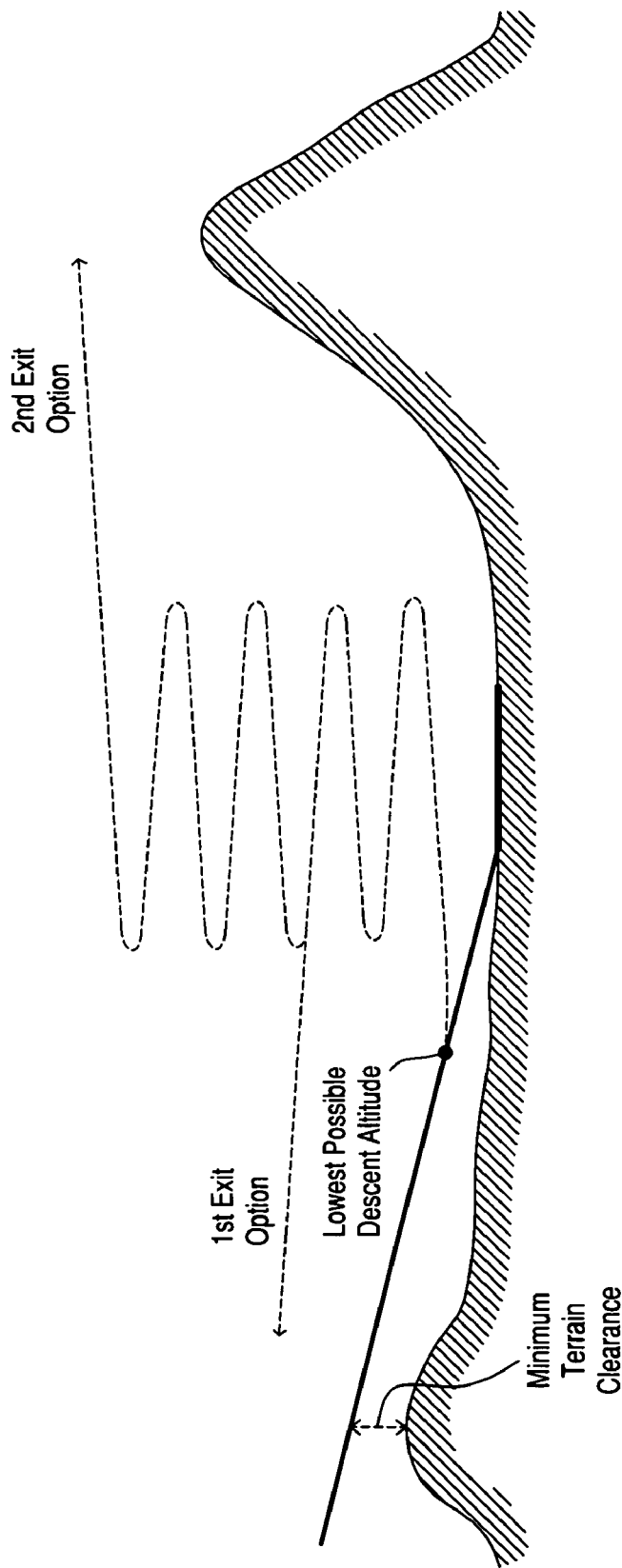
FIG. 4 is a schematic illustration of a circling climb shown as a missed approach procedure at the worst-case, one-way airport, in accordance with the principles of the present invention.

Referring now to FIG. 4, a circling climb is shown as a missed approach procedure at the worst-case, one-way airport. There are two logical exit points from the circling climb. The first option is to exit the climb at the altitude of the published missed approach procedure and follow the published course to exit the one-way airport. The second option is to continue to climb until all terrain in the vicinity of the airport has been cleared. In this option, the aircraft can exit the climb in any direction desired. Both options are covered by the disclosure, because there may be situations where the pilot would prefer to climb to the higher exit point and then depart for an alternative airport by the shortest route possible. Giving the pilot the opportunity to select the preferred exit point is part of the path generation process.

Figure 5:
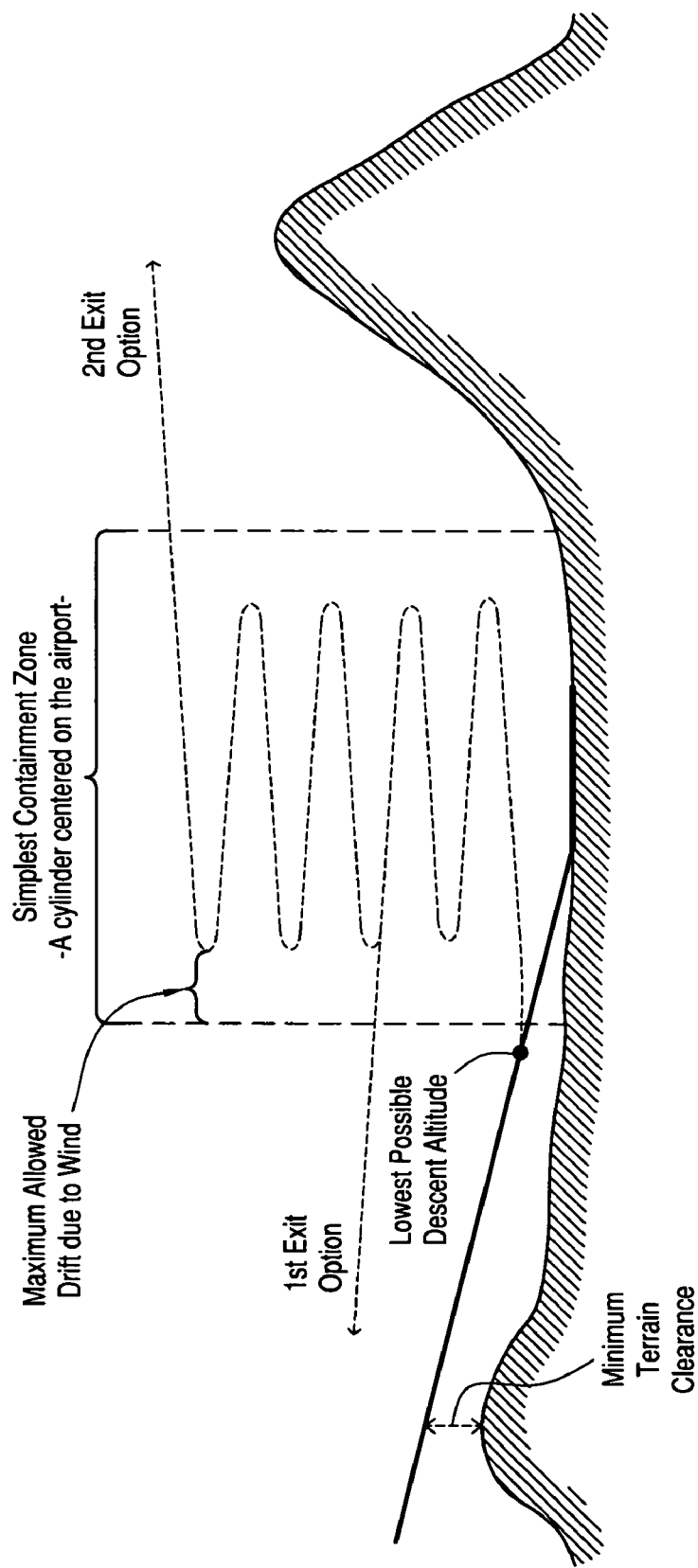
FIG. 5 is a schematic illustration of the simplest possible representation of the containment zone, in accordance with the principles of the present invention.

Referring now to FIG. 5, the simplest possible representation of the containment zone is illustrated. The containment zone is represented as a cylinder which is centered at the airport. The path generation process must verify that the aircraft can climb to the pilot-selected exit point and stay within the containment zone for the duration of the climb. Note that the higher the pilot wishes to climb, the lower the tolerance of wind will be. The first exit option requires roughly half as much time to climb as the second option. This means that roughly twice as great a wind speed can be tolerated by the first option as the second.

Figure 6:
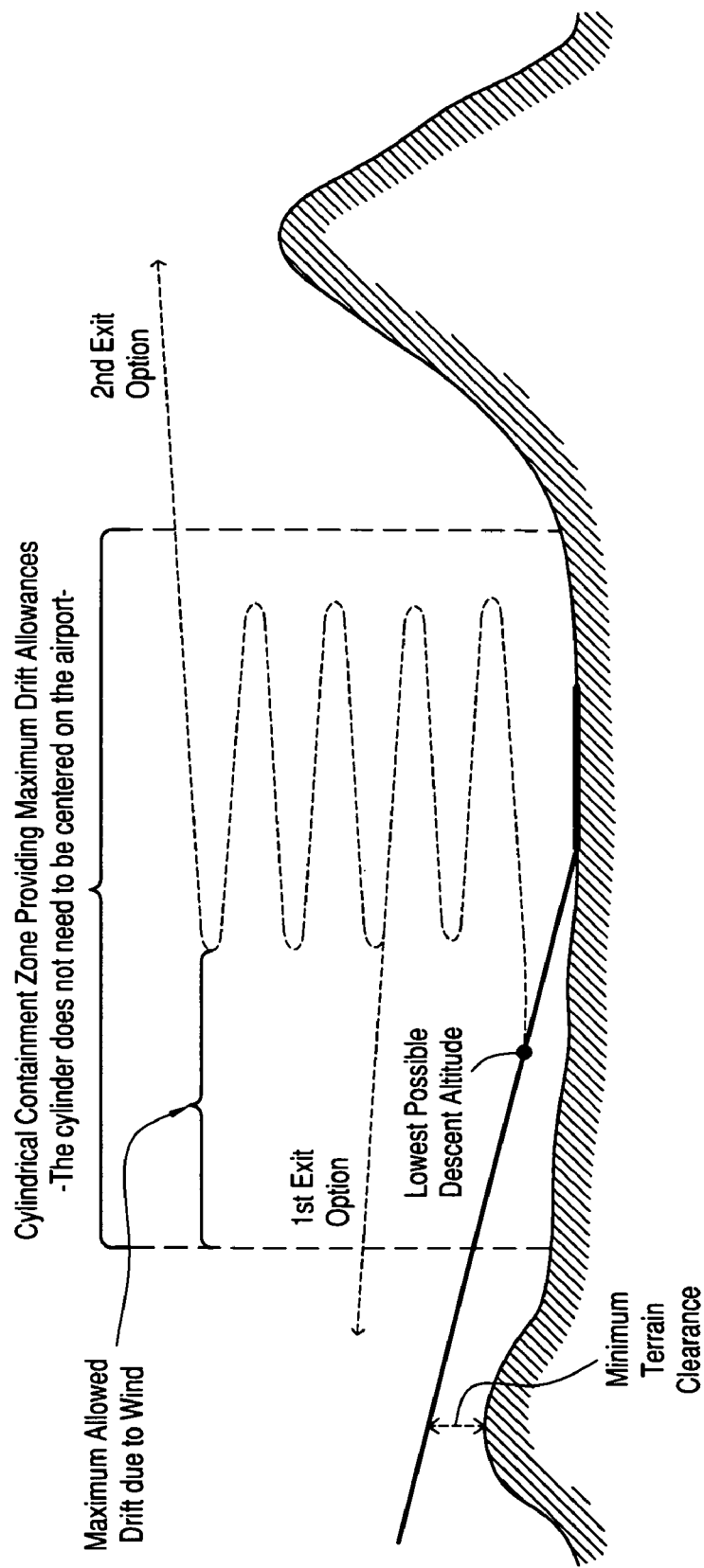
FIG. 6 is a schematic illustration of an alternative configuration of the cylindrical containment zone, in which the cylinder is shown offset from the reference location.

Referring now to FIG. 6, an alternative configuration of the cylindrical containment zone is illustrated. There is no specific reason to require that the containment zone be symmetrical about the airport. In fact, most terrain-challenged airports will have more room to maneuver on one side of the airport than the other. In the configuration of FIG. 6, the cylinder is shown offset from the reference location. The terrain allows the containment zone to be extended in the direction of the arrival path. This increases the area of the containment zone and allows the climbing maneuver to tolerate roughly twice as much headwind (relative to the arrival path) as tailwind.

Figure 7:
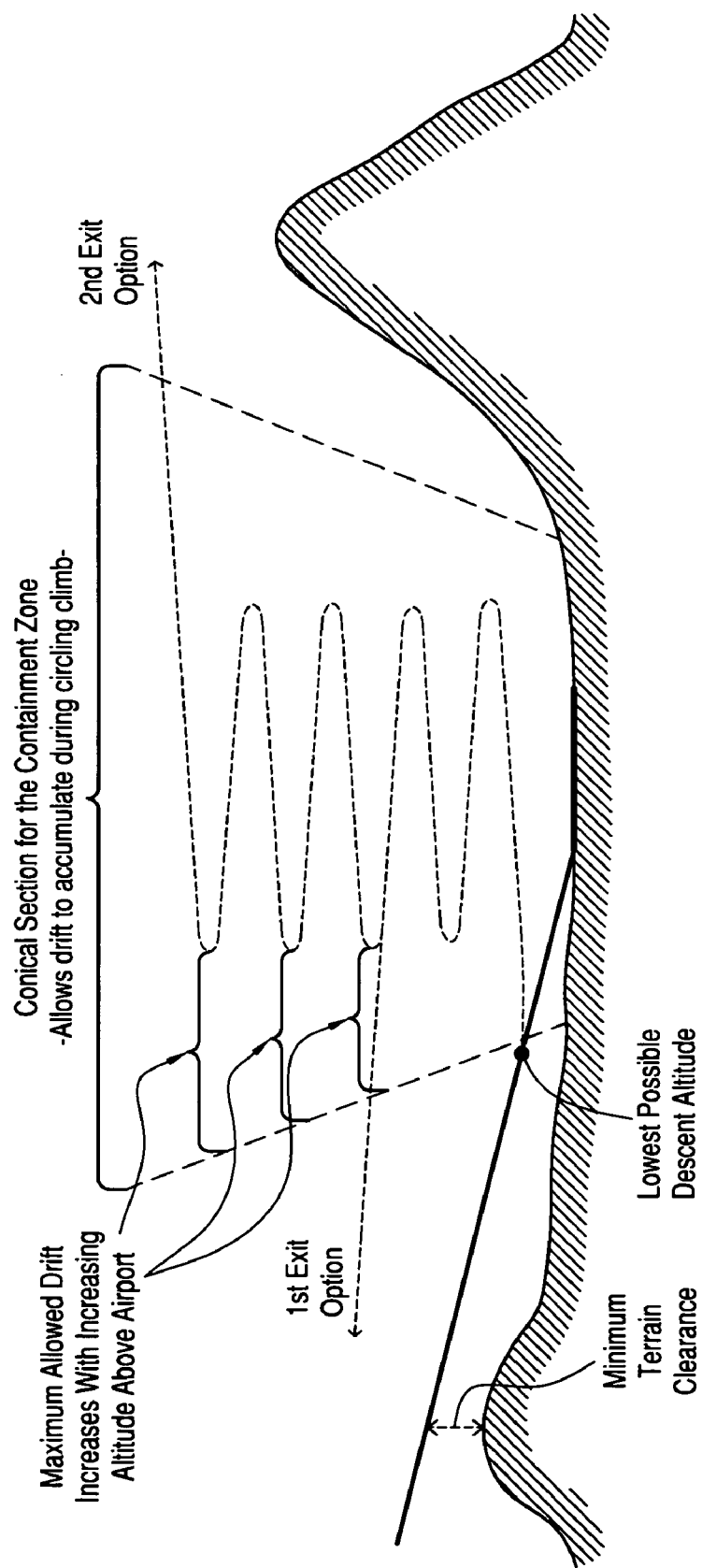
FIG. 7 is a schematic illustration of an alternative configuration of the cylindrical containment zone, in which the containment zone is represented as a conical shape that allows for drift to accumulate during the circling climb.

Referring now to FIG. 7, another alternative representation of the containment zone is illustrated. In most cases, there will be more room to maneuver safely the higher the aircraft is above the runway altitude. Even steep terrain in the vicinity of the airport is far from being truly vertical. This means that the containment zone can increase in size as elevation increases. The only significant exception would be very tall human-made obstacles (e.g. skyscrapers) in the vicinity of the airport. Thus, the containment zone is represented as a conical shape that allows for drift to accumulate during the circling climb.

Figure 8:
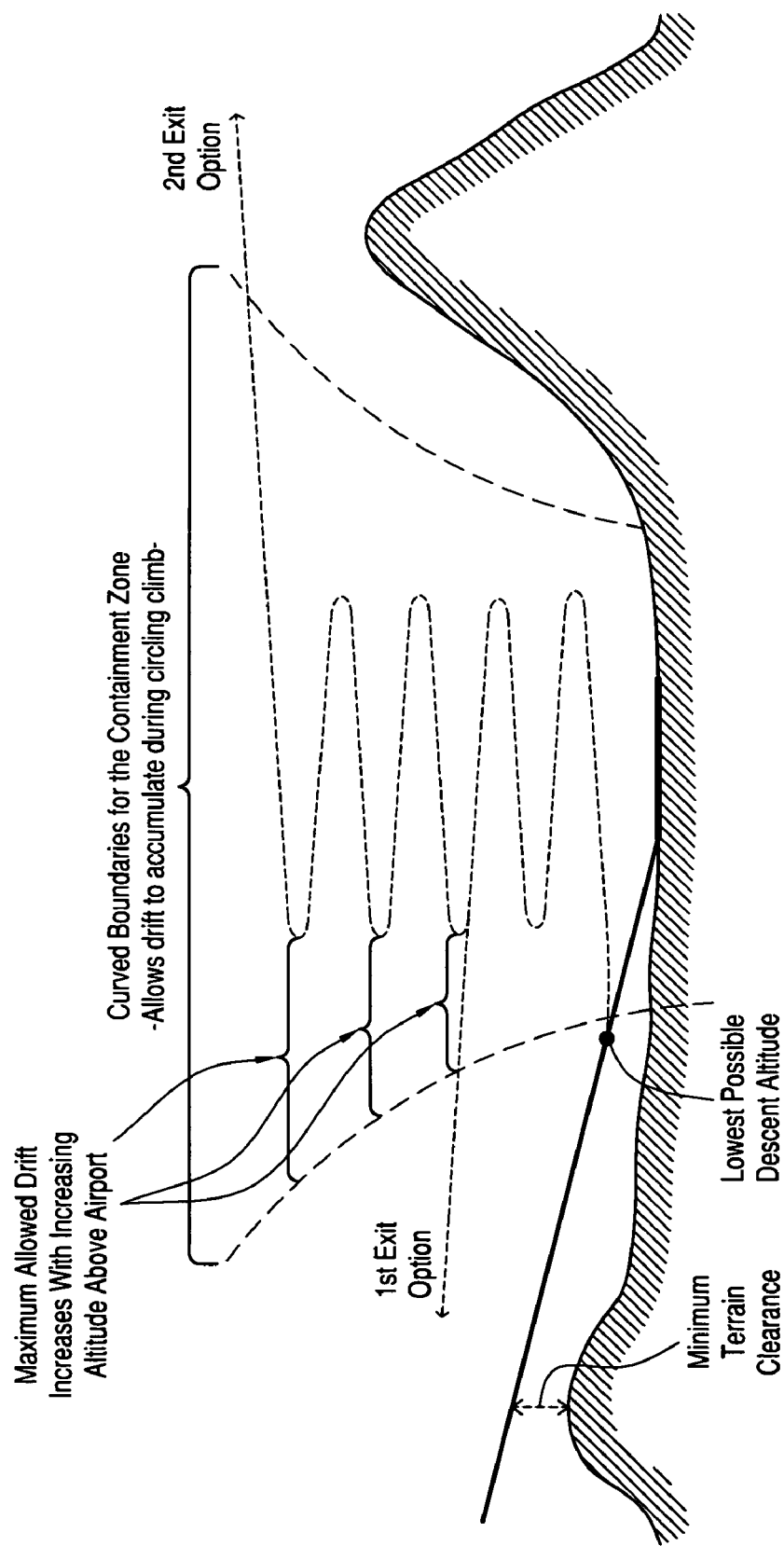
FIG. 8 is a schematic illustration of an alternative configuration of the cylindrical containment zone, in which the containment zone is represented with curved boundaries.

Each containment zone in the preceding configurations has a diameter that increases in a linear fashion with increasing altitude (i.e. the boundaries of the zone are straight lines). However, this is not a requirement. Referring now to FIG. 8 a configuration is illustrated showing curved boundaries (roughly parabolic in nature) where the rate of the increase in the diameter of the zone is roughly linear with respect to altitude. In actuality, almost any shape (horizontal or vertical) may be used to represent the containment zone so long as the zone can be represented numerically and it does not require excessive computational power to verify that the generated path can stay within the containment zone.

Containment zones may typically be defined by a ground-based tool (fully or semi automatically) using terrain databases, obstacle databases, restricted airspace databases, and rules derived from the clearance requirements of the TERPS. (However, the containment zones could be defined by a trained person using the same information and rules.)

Figure 9:
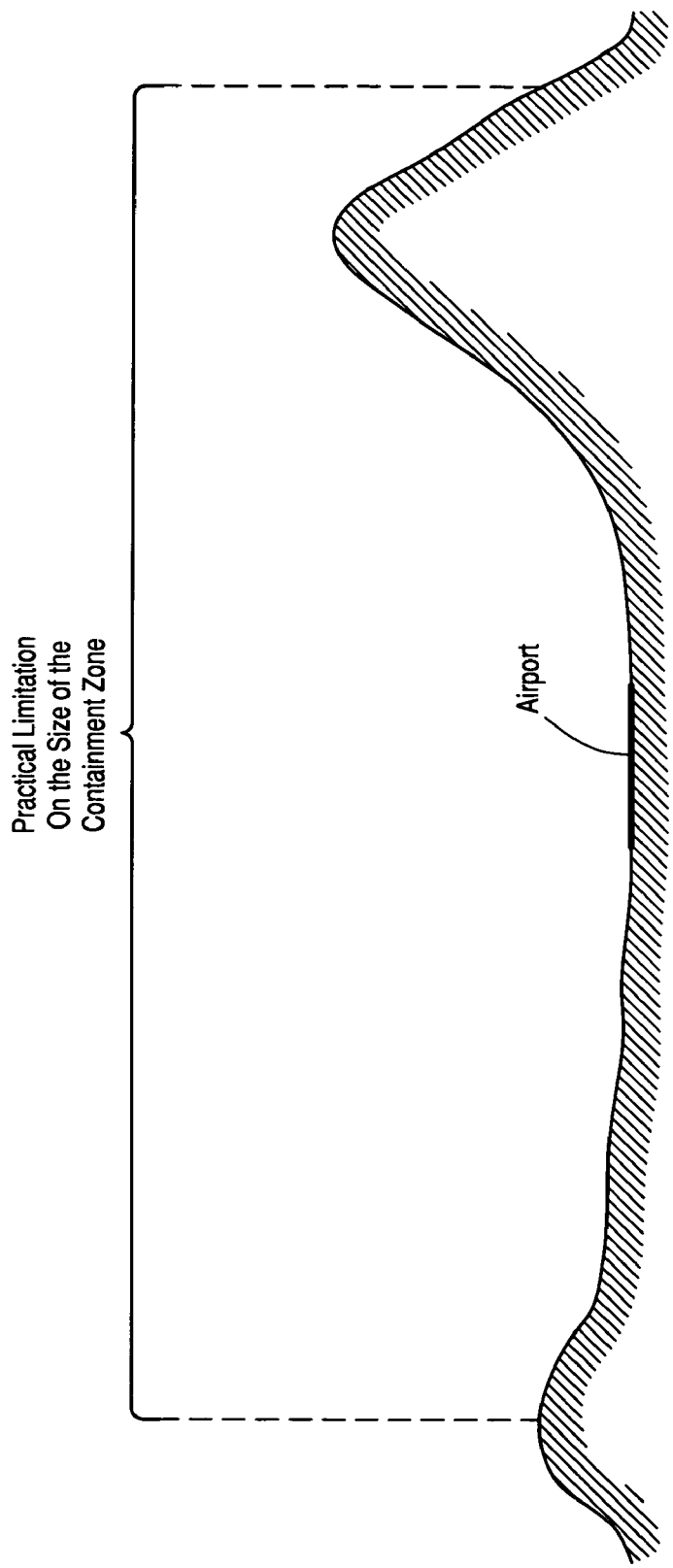
FIG. 9 illustrates a first step in defining a containment zone by designating its maximum potential area.

Referring now to FIG. 9, the maximum potential area for a containment zone is illustrated. This is a first step in defining the containment zone. The process to define containment zones generally restricts the horizontal axis to some maximum lateral distance from the center of the airport. This maximum lateral distance will either be constrained by the presence of precipitous terrain or by practical issues, for example the aircraft can drift about four miles laterally during a five minute circling climb in a 50 mile per hour wind. This distance will be optimized during process and procedure development, but is likely to be less than 5 miles (note that the final approach fix is typically about 5 miles from the runway threshold and there is little value in defining a circling flight path that would allow the pilot to drift out past the final approach fix).

Figure 10:
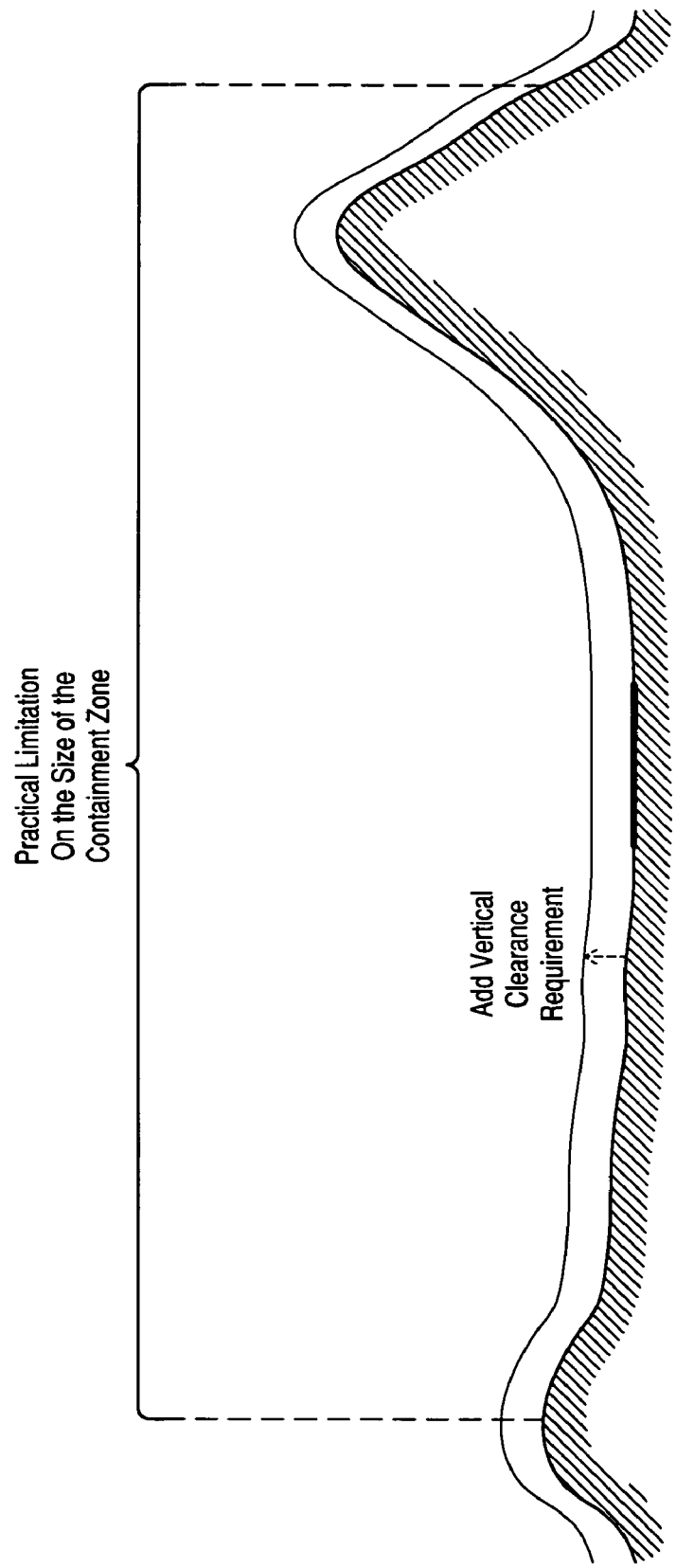
FIG. 10 illustrates the second step in defining the containment zone, by adding a TERPS vertical clearance requirement to a surveyed altitude of the terrain and obstacles within the potential containment zone.

Referring now to FIG. 10, the next step in calculating the containment zone is illustrated. The TERPS vertical clearance requirement is added to the surveyed altitude of the terrain and obstacles surrounding the airport. This defines a vertical clearance offset, i.e. the lowest possible altitude that the aircraft can be for any given location surrounding the airport without violating the clearance requirements.

Figure 11:
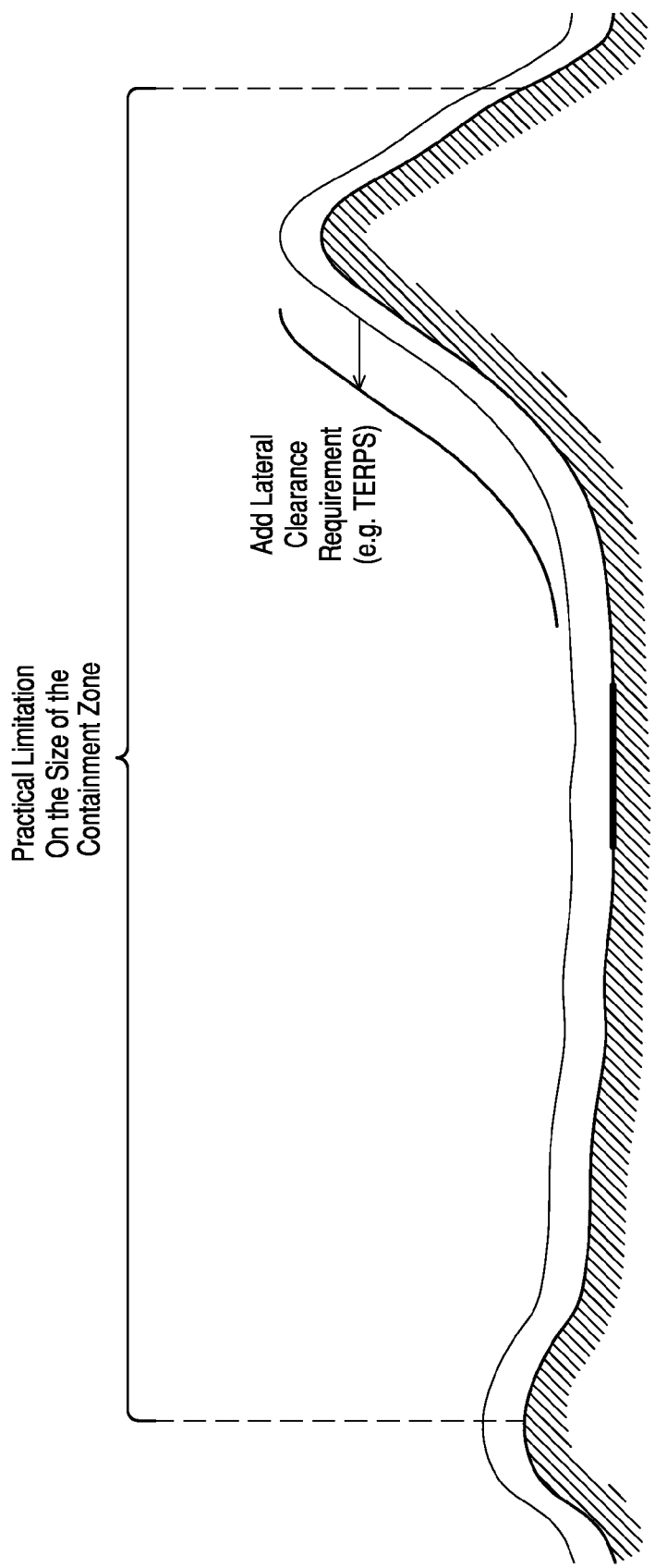
FIG. 11 illustrates the third step of adding a TERPS lateral clearance requirement to all slopes facing the reference location.

Referring now to FIG. 11, the next step in calculating the containment zone is illustrated. The TERPS lateral clearance requirement is added to all slopes facing the airport. Taken together, the lateral and vertical clearance offsets from the surveyed terrain data define areas in which the aircraft may not fly. Any airspace above the two offsets then represents safe operating airspace. Note that similar processing must be applied for human-made obstacles and restricted airspace.

Figure 12:
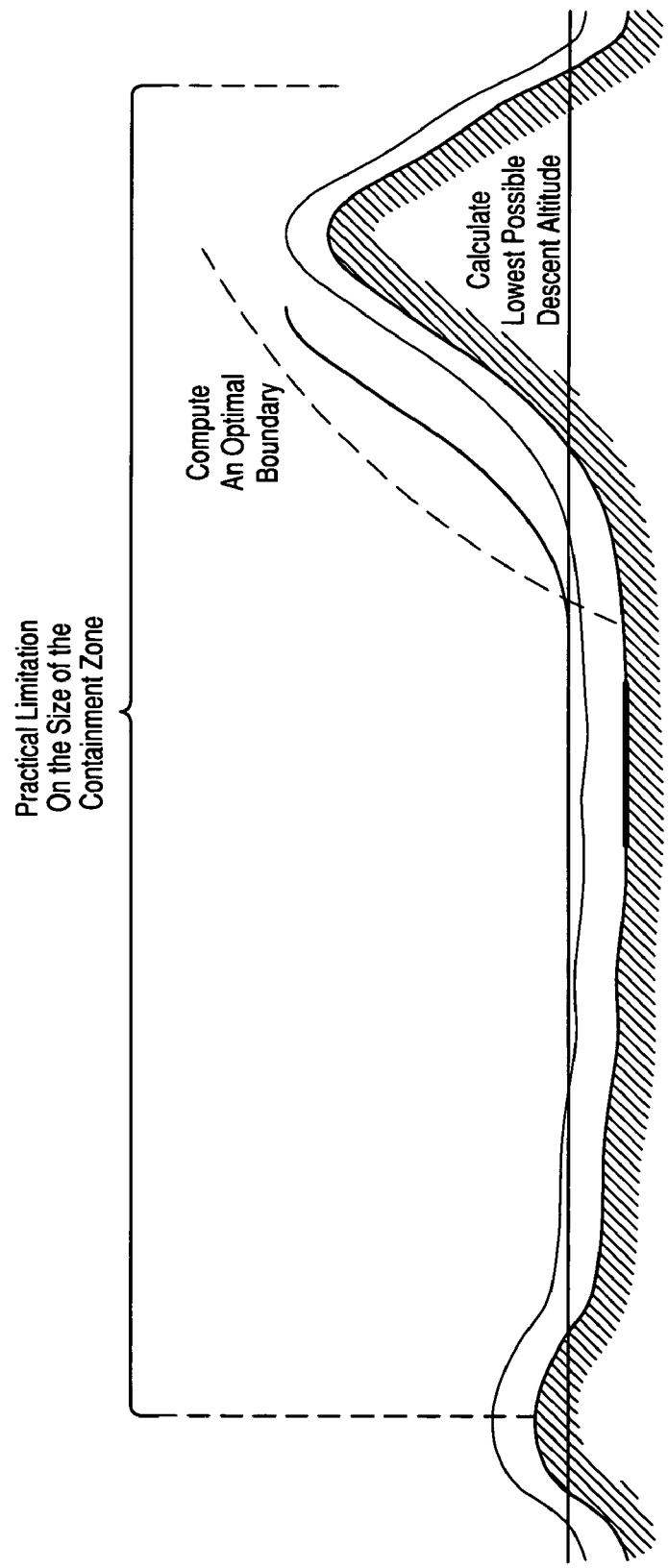
FIG. 12 illustrates the next steps by defining vertical boundaries by adding an additional buffer to the vertical and lateral clearance offsets.

Referring now to FIG. 12, the next steps in calculating the containment zone is illustrated. These steps involve computing vertical boundaries (which may be linear or non-linear) which meet the TERPS clearance requirements plus some additional buffer spaces to accommodate system errors, as well as calculating the lowest possible descent altitude for an approach to the airport. These last two steps should be performed for a full 360° circle about the airport and most likely involve one or more iterations to find the optimal size and shape of the containment zone.

The containment zones may be represented in a machine-readable format (e.g. stored in a database) to allow an airborne computer system to generate hazard free paths. However, these inventive concepts may also be implemented as an integral part of an automated flight system (e.g. an FMS (flight management system) and/or Autopilot).

Path Generation:

The generation of the missed approach path is based upon current atmospheric data that affects aircraft performance (e.g. air temperature, pressure, etc) and the current movement of the air mass (winds at the airport). Given the atmospheric data, winds, aircraft weight, and expected engine performance, the system calculates the lowest possible descent altitude that can be achieved under these conditions for each possible exit point from the climb. Note there are two obvious exit points for any given circling climb. The first exit point occurs at the altitude which will allow the aircraft to engage the published missed approach procedure. The second exit point will allow the aircraft to clear all terrain within the vicinity of the aircraft. Additional exit points may be useful to implement alternatives to the published missed approach procedure, but these exit points would be dependent upon the creation of these alternative procedures as part of some database creation process (not a real-time function on the aircraft).

The pilot is shown one or more representations of the nominal circling climb path (with winds taken into account) for each exit point from the climb. The pilot selects an exit point which then defines the lowest possible descent altitude for the approach.

Procedure Execution:

The system monitors all the conditions that affect the ability of the aircraft to perform the selected missed approach procedure (descent altitude, circling climb, and exit point) and issues a warning if the approach cannot be continued (for example of wind speed or direction is different than used in the generation of the path). The pilot should initiate a go-around (start the circling climb) when the warning is issued.

Other embodiments and configurations may be devised without departing from the spirit of the invention and the scope of the appended claims.

The invention claimed is:

1. A method for calculating a safe extraction path from a terrain-challenged airport using an airborne computer system, comprising the steps of:
   a) defining at least one containment zone for a circling climb departure path relative to a reference location;
   b) receiving aircraft performance data from an on-board flight management system;
   c) receiving air mass parameters from on-board aircraft sensors;
   d) calculating the maximum allowable climb altitude (MACA) utilizing said at least one containment zone, said received aircraft performance data, and said received air mass parameters; and,
   e) comparing said MACA to at least one selected safe departure altitude (SDA) to calculate the lowest possible descent altitude that can be achieved while ensuring that at least one safe extraction path exists,
      wherein steps a)-e) are computed on a just-in-time basis during an approach and prior to a published decision point to allow the approach to be continued beyond the published decision point.

2. The method of claim 1, wherein said step of defining at least one containment zone comprises the steps of:
   a) defining the maximum potential area for a potential containment zone;
   b) adding a TERPS (Terminal Instrument Procedures) vertical clearance requirement to a surveyed altitude of the terrain and obstacles within the potential containment zone, thus defining vertical clearance offsets being the lowest possible altitudes that the aircraft can be for any given location surrounding the reference location without violating clearance requirements;
   c) adding a TERPS lateral clearance requirement to all slopes facing the reference location thus defining lateral clearance offsets; and
   d) defining vertical boundaries by adding an additional buffer to said vertical and lateral clearance offsets.

3. The method of claim 1, wherein said step of defining at least one containment zone comprises defining a containment zone defined by a cylinder centered on said reference location.

4. The method of claim 1, wherein said step of defining at least one containment zone comprises defining a containment zone defined by a cylinder offset from said reference location.

5. The method of claim 1, wherein said step of defining at least one containment zone comprises defining a containment zone defined by a conical shape.

6. The method of claim 1, wherein said step of defining at least one containment zone comprises defining a containment zone defined by substantially parabolically curved boundaries.

7. The method of claim 1, wherein said reference location comprises an airport.

8. An airborne computer system for calculating a safe extraction path from a terrain-challenged airport, comprising:
   a) means for defining at least one containment zone for a circling climb departure path relative to a reference location;
   b) means for receiving aircraft performance data from an on-board flight management system;
   c) means for receiving air mass parameters from on-board aircraft sensors;
   d) means for calculating the maximum allowable climb altitude (MACA) utilizing said at least one containment zone, said received aircraft performance data, and said received air mass parameters; and,
   e) means for comparing said MACA to at least one selected safe departure altitude (SDA) to calculate the lowest possible descent altitude that can be achieved while ensuring that at least one safe extraction path exists,
      wherein steps a)-e) are computed on a just-in-time basis during an approach and prior to a published decision point to allow the approach to be continued beyond the published decision point.

9. The system of claim 8, wherein said means for defining at least one containment zone comprises:
   a) means for defining the maximum potential area for a potential containment zone;
   b) means for adding a TERPS (Terminal Instrument Procedures) vertical clearance requirement to a surveyed altitude of the terrain and obstacles within the potential containment zone, thus defining vertical clearance offsets being the lowest possible altitudes that the aircraft can be for any given location surrounding the reference location (airport) without violating clearance requirements;
   c) means for adding a TERPS lateral clearance requirement to all slopes facing the reference location (airport) thus defining lateral clearance offsets; and,
   d) means for defining vertical boundaries by adding an additional buffer to said vertical and lateral clearance offsets.

10. The system of claim 8, wherein said containment zone is defined by a cylinder centered on said reference location.

11. The system of claim 8, wherein said containment zone is defined by a cylinder offset from said reference location.

12. The system of claim 8, wherein said containment zone is defined by a containment zone defined by a conical shape.

13. The system of claim 8, wherein said containment zone is defined by substantially parabolically curved boundaries.

14. The system of claim 8, wherein said reference location comprises an airport.

15. A method for calculating a safe extraction path from a terrain-challenged airport using an airborne computer system, comprising the steps of:
   a) defining at least one containment zone for a circling climb departure path relative to an airport, said step of defining at least one containment zone comprising the steps of:
      i) defining the maximum potential area for a potential containment zone;
      ii) adding a TERPS (Terminal Instrument Procedures) vertical clearance requirement to a surveyed altitude of the terrain and obstacles within the potential containment zone, thus defining vertical clearance offsets being the lowest possible altitudes that the aircraft can be for any given location surrounding the airport without violating clearance requirements;
      iii) adding a TERPS lateral clearance requirement to all slopes facing the airport thus defining lateral clearance offsets; and, iv) defining vertical boundaries by adding an additional buffer to said vertical and lateral clearance offsets;
b) receiving aircraft performance data from an on-board flight management system;
c) receiving air mass parameters from on-board aircraft sensors;
d) calculating the maximum allowable climb altitude (MACA) utilizing said at least one containment zone, said received aircraft performance data, and said received air mass parameters; and,
e) comparing said MACA to at least one selected safe departure altitude (SDA) to calculate the lowest possible descent altitude that can be achieved while ensuring that at least one safe extraction path exists,
wherein steps a)-e) are computed on a just-in-time basis during an approach and prior to a published decision point to allow the approach to be continued beyond the published decision point.

* * * * *